B. F. Joslyn,
Nut Wrench.

Nº 16,844. Patented Mar. 17, 1857.

UNITED STATES PATENT OFFICE.

B. F. JOSLYN, OF WORCESTER, MASSACHUSETTS.

SCREW-WRENCH.

Specification of Letters Patent No. 16,844, dated March 17, 1857.

*To all whom it may concern:*

Be it known that I, B. F. JOSLYN, of Worcester, in the county of Worcester and State of Massachusetts, have invented a new and useful Improvement in Screw-Wrenches; and I do hereby declare that the following is a full, clear, and exact description of the same, reference being had to the annexed drawings, making a part of this specification, in which—

Figure 1:
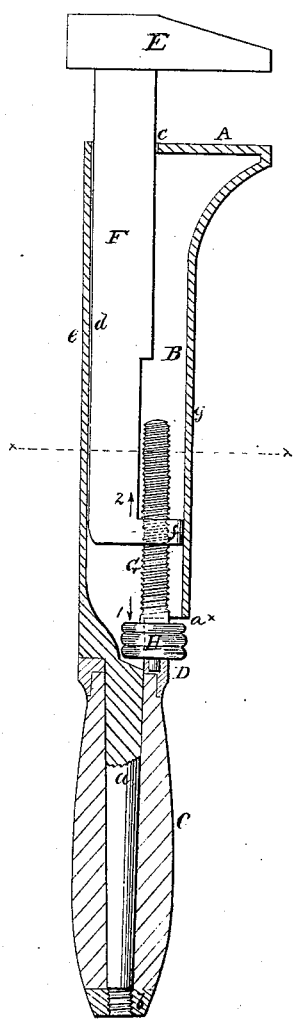
Figure 2:
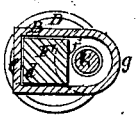

Figure 1, is a vertical section of the lower and stationary jaw and shank and handle, of my improved wrench, the sliding jaw and bar not being bisected. Fig. 2, is a transverse section of ditto, $x$ $x$ Fig. 1, showing the plane of section.

Similar letters of reference indicate corresponding parts in the two figures.

This invention consists in having the shank of the lower and stationary jaw of the wrench made hollow so as to receive the bar of the sliding jaw, and also to receive the screw which is fitted within the hollow shank by the side of the bar of the sliding jaw; the screw passing through a projection on the lower end of the bar of the sliding jaw, the whole being so constructed and arranged, as will be hereinafter fully shown and described, whereby a strong and durable wrench is obtained.

To enable those skilled in the art to fully understand and construct my invention, I will proceed to describe it.

A, represents the lower jaw, and B, the shank of said jaw. The jaw and shank are cast hollow, the lower end of the shank terminating in a solid rod $a$, which passes longitudinally through the handle C, and has a nut $b$, on its lower end. A ferrule D, is attached to the inner end of the handle C, against which the end of the hollow shank B, bears.

E, represents the sliding jaw and F, is its bar, which is attached to said jaw. The bar F, passes through a rectangular slot or opening $c$, in the upper surface of the jaw A. The bar F, is of rectangular form and is allowed to work freely through the opening $c$, without any unnecessary play.

The front edge of the hollow shank B, is rounded, as shown clearly in Fig. 2, but the back edge is flat, forming right angles with its sides. The interior of the shank corresponds in form with its external surface.

On the lower end of the bar F, a projection $f$, is formed. The end of this projection is rounded and bears against the inner side of the rounded front edge $g$, of the shank B, and the back edge $d$, of the bar F, bears against the back edge $e$, of the shank B.

It will be seen that the bar F, is properly guided and kept in proper position within the shank B.

G, represents a screw which is placed within the hollow shank B. The lower or outer end of this screw is stepped in the ferrule D, and a thumb wheel H, is placed on the lower or outer end of the screw, said wheel projecting through a recess $a^*$, made in the end of the hollow shank, adjoining the ferrule D. The screw G, is placed at the front side and parallel with the bar F, and it will be seen, of course, that the sliding jaw E, is moved and adjusted to various-sized nuts by turning the screw G.

By the above improvement, the screw G, is fully protected from dust and dirt and consequently from unnecessary wear. By having the shank of the lower and stationary jaw made hollow as shown, great strength is obtained and when the implement is used, the ferrule D, is not subjected to any force or pressure in the direction indicated by the arrow 1, for the sliding jaw being the outer one, the pressure or force is upon the thread of the screw G, as indicated by the arrow 2. In most of the ordinary screw wrenches, this pressure, or the force exerted against the ferrule D, as indicated by arrow 1, frequently loosens the shank of the jaw within the handle and weakens the implement. In my improvement, this difficulty is obviated and the thumb wheel H, is made to bear against the outer edge of the recess $a^*$, and this end of the shank is abundantly able to sustain any force or pressure to which it may be subjected. The bar F, is held firmly within the hollow shank B, and the implement is rendered strong, durable and efficient.

I am aware that hollow shanks have been previously used and that the bars of sliding jaws have been fitted therein, but wrenches thus constructed have not come into general use as their parts were so arranged that they were liable to get out of repair and, generally, were inefficient.

I do not claim a hollow shank, neither do I claim a screw for operating the sliding jaw, irrespective of the arrangement herein shown, but,

Having thus described my invention, what

I claim as new and desire to secure by Letters Patent, is:

The hollow shank B, with the bar F, of the sliding jaw E, fitted therein, as shown, when the above parts are used in connection with the screw G, placed within the hollow shank and by the side of the bar F, the screw passing through the projection $f$, on the end of the bar F, substantially as described for the purpose set forth.

B. F. JOSLYN.

Witnesses:
 JAMES F. BUCKLEY,
 J. W. COOMB.